(12) United States Patent
Biermann (10) Patent No.: US 12,530,380 B2
(45) Date of Patent: Jan. 20, 2026

(54) OBJECT DATABASE FOR BUSINESS MODELING WITH IMPROVED DATA SECURITY

(71) Applicant: Gerhard Biermann, Paderborn (DE)

(72) Inventor: Gerhard Biermann, Paderborn (DE)

(*) Notice: Subject to any disclaimer, the term of this patent is extended or adjusted under 35 U.S.C. 154(b) by 0 days.

(21) Appl. No.: 18/806,163

(22) Filed: Aug. 15, 2024

(65) Prior Publication Data

US 2024/0411785 A1    Dec. 12, 2024

Related U.S. Application Data

(63) Continuation of application No. 17/051,784, filed as application No. PCT/DE2019/100385 on Apr. 30, 2019, now abandoned.

(30) Foreign Application Priority Data

May 2, 2018 (DE) ...................... 10 2018 110 441.3
May 17, 2018 (DE) ...................... 10 2018 111 867.8

(51) Int. Cl.
   *G06F 16/28* (2019.01)
   *G06F 16/27* (2019.01)
   (Continued)

(52) U.S. Cl.
   CPC ............ *G06F 16/289* (2019.01); *G06F 16/27* (2019.01); *G06F 16/285* (2019.01);
   (Continued)

(58) Field of Classification Search
   CPC ...... G06F 16/27; G06F 16/273; G06F 16/275; G06F 16/278; G06F 16/285; G06F 16/288; G06F 16/289; G06F 21/6245; G06F 21/6227; G06F 40/30; G06Q 10/067; G06Q 10/06
   See application file for complete search history.

(56) References Cited

U.S. PATENT DOCUMENTS 6,078,926 A      6/2000  Jensen et al.
6,341,289 B1 *   1/2002  Burroughs ............ G06F 16/289
                                                      707/762
(Continued)

FOREIGN PATENT DOCUMENTS

EP    2369507 A1 *  9/2011  ......... G06F 16/2237

OTHER PUBLICATIONS

International Search Report mailed on Aug. 7, 2019, in International Application No. PCT/DE2019/100385.
(Continued)

*Primary Examiner* — Robert W Beausoliel, Jr.
*Assistant Examiner* — Cheryl M Shechtman
(74) *Attorney, Agent, or Firm* — Patent Central LLC; Stephan A. Pendorf (57) ABSTRACT

A modular object database for holistic, object-oriented business modeling, in which business data and processes of all types are represented separately in key and value objects, wherein the attributes and methods of the objects are likewise stored separately from one another, and the database management system itself is implemented as objects of the object database, as a result of which simpler handling of the object database and substantially improved data security is achieved overall.

6 Claims, 4 Drawing Sheets

(51) Int. Cl.
*G06F 21/62* (2013.01)
*G06Q 10/067* (2023.01)

(52) U.S. Cl.
CPC ........ *G06F 16/288* (2019.01); *G06F 21/6227* (2013.01); *G06F 21/6245* (2013.01); *G06Q 10/067* (2013.01)

(56) References Cited

U.S. PATENT DOCUMENTS

| | | | | |
|---|---|---|---|---|
| 6,754,670 | B1 * | 6/2004 | Lindsay | ............... G06F 16/25 |
| | | | | 707/999.102 |
| 8,255,426 | B1 * | 8/2012 | Wei | .................. G06F 16/289 |
| | | | | 707/802 |
| 9,600,136 | B1 | 3/2017 | Yang et al. | |
| 2005/0149344 | A1 | 7/2005 | Wachholz-Prill | |
| 2017/0351980 | A1 | 12/2017 | Binder | |
| 2020/0034473 | A1 * | 1/2020 | Rushan | ............ G06F 16/2379 |

OTHER PUBLICATIONS

Translation of the Written Opinion of the International Searching Authority mailed on Aug. 7, 2019, in International Application No. PCT/DE2019/100385.

\* cited by examiner

| subject | predicate | object |
|---|---|---|
| name | has as component | first name |
| name | has as component | family name |
| first name | has as value | word |
| family name | has as value | word |

Fig. 4

| subject | predicate | object |
|---|---|---|
| name | indicate as | schedule |
| name | indicate as | Graph network |
| name | search | ------ |
| offer | generate | ------ |
| product | specify | ------ |

Fig. 5

OBJECT DATABASE FOR BUSINESS MODELING WITH IMPROVED DATA SECURITY

BACKGROUND OF THE INVENTION

Field of the Invention

The invention relates to a method for processing database data in a distributed object database system and to a device for processing database data in an object database system.

The invention relates to a modular object database for holistic, object-oriented business modeling, in which business data and processes of all types are represented separately in key and value objects, wherein the attributes and methods of the objects are likewise stored separately from one another, and the database management system itself is implemented as objects of the object database, as a result of which simpler handling of the object database and substantially improved data security is achieved overall.
Note:
The topics of business modeling, databases and data security addressed below are very complex topics, so only individual aspects and examples can be dealt with in the section on the prior art, though these are selected to illustrate the current state. The examples used below constitute only a small selection and make no claim to completeness. The designations and names used below serve to provide a better understanding and can be substituted by any other designations and names, in particular in the case of those designations which belong to the proposed object database, such as, for example, 'business object

DESCRIPTION OF THE RELATED ART

Business Modeling

The term business modeling is frequently used as a synonym for business process modeling and is not to be confused with the term business model. In the following, business modeling goes beyond pure process modeling insofar as data and process modeling are considered together. For simplicity, the term enterprise includes any kind of company, firm, trade, administrative body, educational establishment, institution, organization, association, private individual etc.

The current state of business modeling is best reflected in internationally recognized standards such as, for example, ISO 9001 and IATF 16949, based thereon, for the automobile industry. ISO 9001 applies not only to manufacturing companies, but also to enterprises that provide any type of service. Certification of an enterprise according to ISO 9001 is intended to give customers, suppliers or other stakeholders the confidence that a company operates with high, standardized quality criteria. For this purpose, enterprise goals are to be defined, for example, in the areas of customer focus, supplier relations and leadership for the purpose of checking target attainment and pursuing continuous improvement. For this purpose, the ISO requests a process-oriented approach, which means that an enterprise must define a complete process landscape and structure.

In such process-oriented business modeling, procedures and their associated responsibilities are paramount, while data only function as parameters. Processes are often stored in their own databases, where they are generally only documented and can be called as information and but not run in an automated manner. Data flows are thus often difficult to track and automation is often very complex because the data are stored in different databases, such as, for example, in product data management systems, product requirement systems, standards information systems, personnel databases and project management systems.

Because of the different databases, it is very complex to link data or information to one another, such as, for example, link a drawing in a factory standard, stored as a document in a standard database, with the geometry of a component of a product which is stored in a product data database or, furthermore, automatically add the drawing to the component. In addition to the exemplarily mentioned individual databases, there are monolithic systems which cover entire subject areas, such as product lifecycle management systems (PLM). The various aspects of the PLM are based on a common database so that links between the data can be produced more easily, for example between the product requirements and the product data. Changes to the database are, however, associated with considerable effort.

Various methods are available for describing the process structures. Flowcharts are a visual representation of processes which are modelled by methods such as EPC (event-driven process chain) or BPMN (business process model and notification, a standardized description language). A frequently used type of visualization of processes is the swim lane diagram. For each area of responsibility or actor in a process, there is a row or column in which the process steps are shown for which the actor has responsibility. Arrows indicate the process flow, and the responsibilities are clearly shown visually by the transition from one process step in one lane to another in another lane. This type of representation makes it clear that in process-oriented business modeling one of the aims is to describe which role in the enterprise has to perform what and when. Various roles in an enterprise are responsible for the creation and execution of the processes; generally, it is not provided that data are able to autonomously control and execute processes.

Knowledge Management

Requirements for knowledge management are also to be found In the 2015 revision to ISO 9001, since this issue is becoming increasingly important in enterprises. Even if the value of knowledge cannot be specifically quantified, knowledge is an important capital for enterprises. Protecting knowledge is of great importance, because not everyone is allowed to access knowledge in its entirety. The aim of knowledge management is to make the correct information available in an enterprise at the correct time and the correct location. Various categories specify knowledge: implicit versus explicit, individual versus organizational and external versus internal. While explicit knowledge can be well documented, such as in manuals, standards, processes, rules, etc., implicit knowledge is difficult to capture because it is based on experience, skills, etc., making it individual knowledge, or it is present in data sets where it has to be obtained only by analyses. Knowledge can be documented in a wide variety of ways, as described above or even in large knowledge databases, which provide vast amounts of information and have not proven effective, or in the form of rules. Rules are often formulated as conditional sentences: if a condition is met, then make a certain decision or respond with an action. Rules can assist, for example, in analyzing data sets. If B is a child of A and A is female, then A is a mother of B. In this way, mothers can be found in the database without the need for 'mother' itself to be in the data set. And they can trigger actions: If product A has component B as a constituent, then add standard geometry C to component B. Business rule management systems (BRMS) allow enterprises to have rules defined by experts, which are implemented either by IT experts or automatically in software. Rules are an important form of expression for self-operating knowledge. The problem here is that rules must access data which are stored in different database systems, so access is possible only using interfaces which are complex to implement.

Databases

For storing data which arise in an enterprise—as described above, processes are generally also merely data-relational databases are usually used. They store data in the form of relational tables which include specific data and also keys to rows in other tables, the relations. The database management system (DBMS) is responsible for access to specific data in the tables, and, inter alia, provides data operations and ensures data integrity. The DBMS processes commands that are programmed in the Structured Query Language (SQL) and can thus create structures and store or read data. It is only with difficulty that complex data structures can be mapped onto the flat relational table structures. Likewise, complex table structures can only be changed and expanded with considerable effort.

Compared to relational databases, object-oriented databases (OODB) are rarely encountered. An OODB allows objects with their properties (attributes) and behaviors (methods) to be created as a structure or schema of data and allows values to be stored as their instances. The attributes themselves can consist of other objects. Here, too, a database management system controls the corresponding data processing steps, in this case the object-oriented database management system (OODBMS). In contrast to the relational methods, the object-oriented approach supports a simpler representation of complex data structures. Conversely, object-oriented databases have a disadvantage when it comes to the processing of large quantities of data because, for example, the access paths are more complex as a result of mechanisms such as inheritance, etc.

Figure 1:
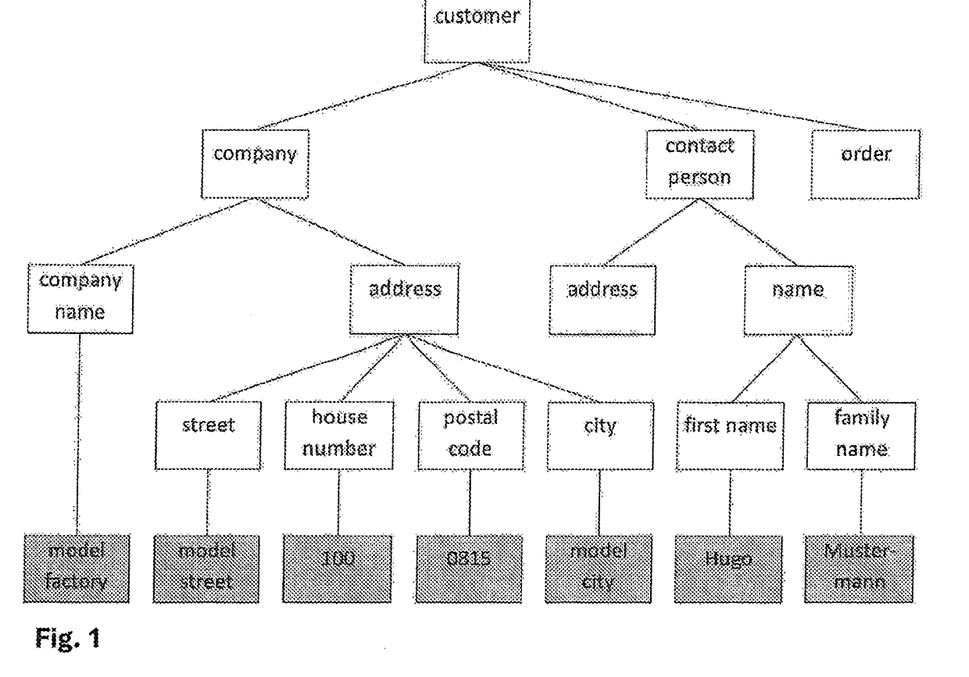

In principle, all real and virtual things and subjects which belong to a specific class with defined, identical properties, i.e. everything which makes up an enterprise, can be represented as objects: for example, a product with its sub-assemblies, a service, a product requirement, the customer, an offer, a standard, an organizational unit and training. The examples show that an object can have a more or less complex structure and can be composed structurally of other objects. For example, a customer can include a company with company name and address, a contact partner with their contact data, queries, orders, deliveries, etc., which can also be represented as objects (FIG. 1). With the mechanisms of inheritance, encapsulation and polymorphism, the object-oriented approach with the integration of data and methods offers many advantages over relational tables. In software development, the object-oriented approach has been implemented with respect to the procedural (process-based) approach but not yet in databases. The patent specification EP 0 504 085 B1 describes a method for accessing a relational database from an object-oriented environment.

An object database is known from DE 10 2010 010 035 A1, in which the objects each consist of units with attributes and methods. Object templates are used to create new objects. For this purpose, existing objects and associated relationships are copied and stored.

Furthermore, there are also the so-called NoSQL (often meaning "not only SQL") databases. Key-value databases belong to this group. As the name implies, there are unique keys to which one or more values are assigned. The data are not accessed via relations, but instead only via the keys. Access via the values is thus not possible unless an additional back entry with the value-key relationship is created. Key-value databases do not work like the relational databases with fixed schemas and are well suited for distribution, but are not suitable for every application such as, for example, for the Semantic Web.

The Semantic Web is based on graph databases, which also belong to NoSQL applications. They represent structures by connecting nodes (entities) to edges (relations) and defining these graphs, for example with triples. Graph databases show advantages with respect to multi-layered networked data, such as in social networks: Man1 knows Woman1; Man knows Woman2; Woman1 knows Woman3. By means of traversing in the graph network, the second-degree contacts of Man1, for example, can be determined very efficiently: Woman3. Graph databases do not require a fixed schema, so they are very easily expandable. The property graph model provides for expansion. The nodes receive additional properties as key value pairs. This could be the age of the persons in the above-mentioned contact network.

If a data set is stored on only one server in a database, it is known as unique data. This computer is located in one location of an enterprise, and all requests from other locations are made to this one database, which can lead to performance problems in enterprises which operate internationally. This can be redressed by distributed databases. In this case, the data set can be distributed redundantly as replica on a plurality of servers at different locations, but increased demands are made on data consistency. Another possibility of distributing databases is provided by partitioned data storage. In horizontal fragmentation, the data records are not redundant on different servers, but only the data necessary in each case for a location are stored at the location. In the case of vertical fragmentation, the logically coherent data for a location are distributed, for example in the case of a personnel database the wages in the personnel department and the contact data at the production site. The patent specification EP 13 89 5720.4 proposes a methodology for a dynamically scalable relational database for a distributed heterogeneous platform with an agenda server and supervisor process module. These relate to data management, with the data itself also being stored in relational databases. Object-oriented databases store the data in more or less large databases, depending on requirements, and can also be fragmented if required. Object-oriented relationships, however, do not make distribution simpler. In this case also, fragmentation is referred to when logically coherent objects are distributed. The objects to be stored individually would render the OODBMS inoperably complex to manage.

Data Security

As the examples show, enterprises store considerable amounts of data from a wide range of areas. In the course of developing new digital business models, the type and quantity of captured and stored data to be protected increases rapidly. Personal data are of particular significance. Thus, Section 1 of the German Federal Data Protection Act (BDSG) regulates the protection of the individual with respect to the handling of their personal data. In addition to these legal requirements, enterprises have a vested interest in protecting all other data from unauthorized access; this is because there is a lot contained in databases, perhaps even the entirety of an enterprise's knowledge: innovative products, efficient production processes, business processes, factory standards and working instructions, which describe special knowledge, etc. The protection of data against unauthorized access is of vital necessity for an enterprise.

The topic of data security is very complex and, therefore, reference is made here to the IT Baseline Protection Catalogs (IT-Grundschutz-Kataloge) of the German Federal Office for Information Security (BSI). Another example is the EU General Data Protection Regulation (GDPR), which is effective from May 2018. In this way, personal data belong to the user and not to the Internet service involved in data processing. In order to implement the provisions, an enterprise is granted a transition period of two years to take appropriate measures, such as, for example, adapting databases and establishing data protection processes. Despite security measures such as, for example, multi-factor authentication and cryptographic methods, there are still recurring incidents of unauthorized persons gaining access to confidential data. If, by a cyber-attack, access is gained to unique data records in a database, all stored data including their structures are available to the attacker. If there is unauthorized access to partitioned data, not all data records are surrendered in an unprotected manner, but only those stored on the relevant server.

BRIEF SUMMARY OF THE INVENTION

The object of the invention is to propose a database methodology for holistic business modeling with all business data and processes of an enterprise which allows data including their structures to be more easily defined, expanded and changed and which is organized such that a scalable security concept with accompanying increased security for the database is ensured.

The invention encompasses a method for processing data in an object database system, wherein the method comprises creating a plurality of business objects each with a plurality of instances to serve as a decentralized database each with its own decentralized database management system, wherein
  the business objects are each stored as fragmented business objects as a decentralized database at different storage sites in order to handle very large amounts of data and processes, wherein said business objects are linked to other fragmented business objects via relationships to one another, the business objects are fragmented into attributes and methods, wherein the attributes and methods are stored separately and wherein the attributes are implemented and stored as fragmented business objects each with a plurality of datasets,
  the relationships between the fragmented business objects are created according to a freely definable sentence structure in order to form structural relationships which are stored as a plurality of instances in a business object,
  the methods are created as an assignment of services stored as a plurality of instances in a business object or actions stored as a plurality of instances in a business object to fragmented business objects according to a freely definable sentence structure in order to form structural methods, and
  the fragmented business objects and the structural relationships and the structural methods are stored in a data memory of one server at one location or in data memories of a plurality of servers arranged so as to be distributed over a plurality of locations in order to handle very large amounts of data and processes and for reasons of data security,
  for process-oriented business modeling, data are defined as fragmented business objects and processes are assigned to these fragmented business objects as methods, so that processes can therefore take place automatically in a controlled manner by the fragmented business objects.

Further, the invention encompasses a device for processing data in an object database system, wherein business objects are provided as data, wherein
  the business objects each stored as fragmented business objects at different storage sites wherein said business objects are linked to other fragmented business objects via relationships to one another,
  the relationships between the fragmented business objects are created according to a freely definable sentence structure stored as instances in a business object in order to form structural relationships and
  the methods are created as an assignment of services stored as instances in a business object or actions stored as instances in a business object to fragmented business objects according to a freely definable sentence structure in order to form structural methods, and
  the fragmented business objects and the structural relationships and/or the structural methods with its instances are stored in a data memory of one database server at one location or in data memories of a plurality of database servers arranged so as to be distributed over a plurality of locations in order to handle very large amounts of data and processes and for reasons of data security,
  for process-oriented business modeling, data are defined as fragmented business objects and processes are assigned to these fragmented business objects as methods, so that processes can therefore take place automatically in a controlled manner by the fragmented business objects.

BRIEF DESCRIPTION OF THE SEVERAL VIEWS OF THE DRAWINGS

Exemplary embodiments of the object database are shown in the figures. There is shown in
  FIG. 1: A section from an example object database.

DETAILED DESCRIPTION OF THE INVENTION

In principle, the object-oriented approach for the database is chosen because this methodology allows a simpler, intuitive definition of the data structures. All business data and processes in an enterprise can already be regarded per se as objects and can therefore easily be transferred into the object structure of the proposed object database as business objects (BOs). The term business object (BO) is an arbitrarily chosen name for differentiating from the usual objects in object databases. The proposed methodology is referred to as Semantic Business Modeling (SBM). An example is shown in FIG. 1. An enterprise sells products to different companies and wishes to create a customer object database. The 'customer' BO has the 'company' BO as an attribute, which in turn has a company name and address as sub-objects, which are in turn sub-structured according to FIG. 1. Furthermore, the 'customer' BO has the orders and a contact partner of the customer as components, for example in central purchasing, with the corresponding further substructures. In addition to the simple definition of structures, a further advantage is clearly described here: If the 'address' BO is defined, it can be reused at various points of the object structure, in particular not only the structure and the contained data as instances, but also the associated processes in the object-oriented sense. The reusability of BOs in the SBM methodology makes it possible to implement platform strategies in the object database.

While conventional databases store several objects together in a database with keys, values and methods, SBM offers possibilities for partitioning, specifically fragmenting, the objects into key and value objects and separately storing attributes and methods. Furthermore, in contrast to conventional methods, the database functionality is fragmented in that it is itself held as objects in the object database and is implemented via assigned services as methods, as a result of which objects can operate according to different database principles. The executable code is additionally stored separately from the methods. This methodology, in principle, enables autonomously acting objects. SBM enables new, scalable storage structures for an object database, and a significant gain in data security can be noted in particular because the fragmented database functionality is distributed among a plurality of specially secured storage sites.

Figure 2:
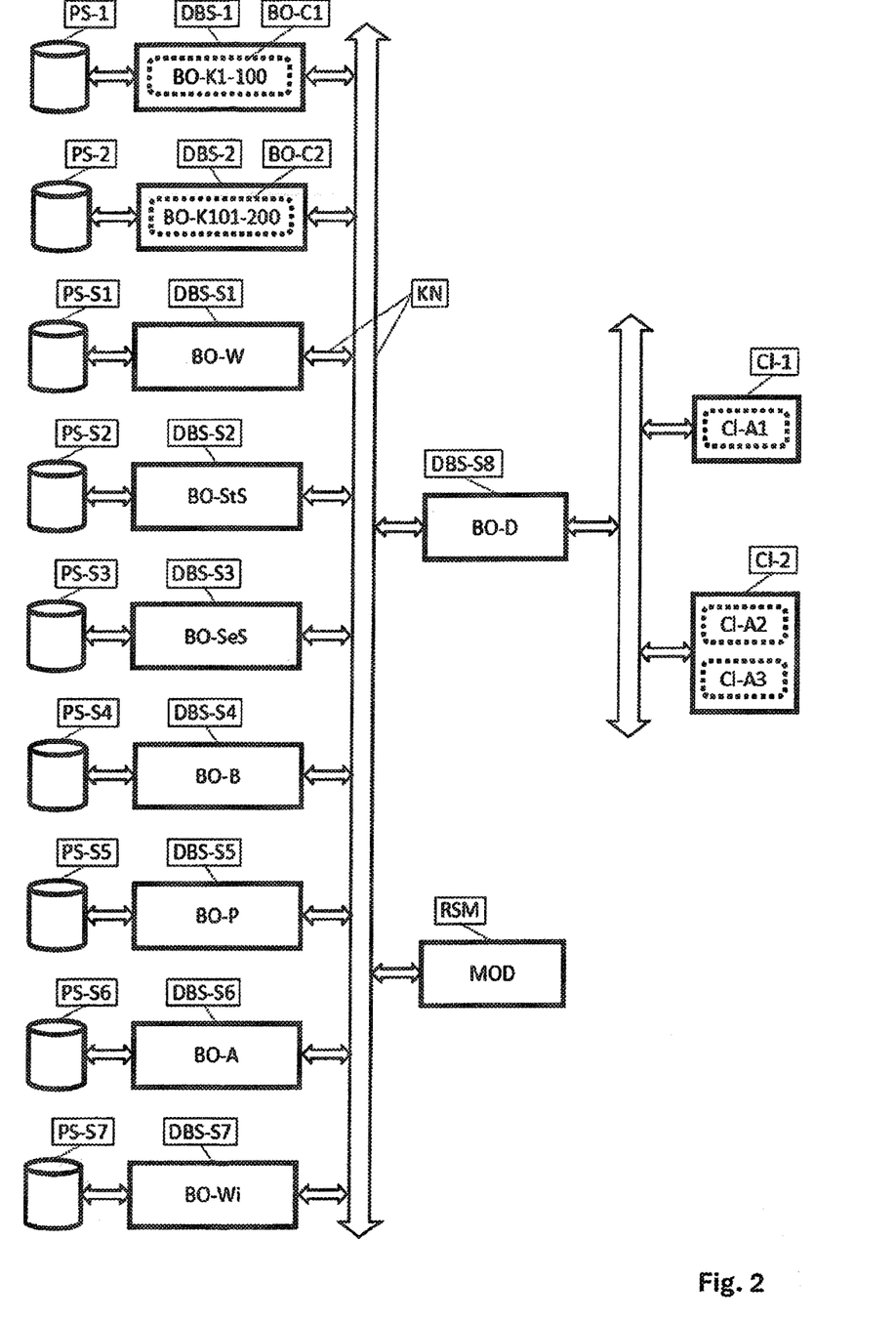
FIG. 2: An example of the object database in a client-server structure.
Figure 3:
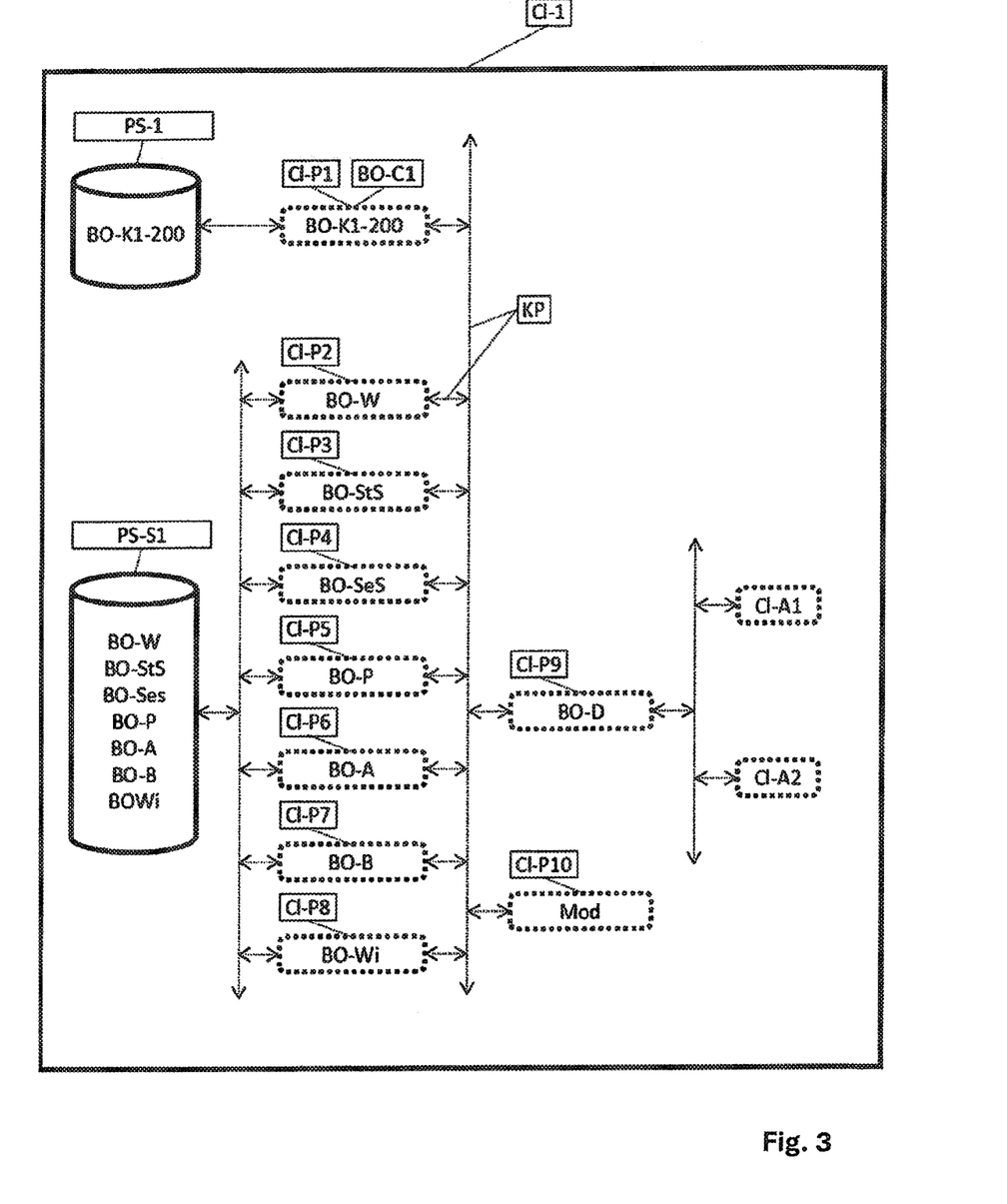
FIG. 3: An example of the object database on a client.

Business Object Keys (Key Objects):

The key BO keys (key objects), which have a light background in FIG. 1, are created such that they first do not contain any specific data in their stored instances, but only keys, which constitute a reference to an instance of a subordinate BO (also the names of the BOs are only keys), and secondly can be stored alone, i.e. independently of other BOs. All BOs are derived from a 'base' BO so that they have certain basic attributes and functionalities. BOs can be stored so as to be organized in any groups (clusters), with the independence of the BOs not being affected. The cluster itself is a BO which provides services to process requests and the access to the cluster itself, and delegates these to the individual BOs. The instances of the clusters can be distributed among any number of servers (FIG. 2) or, if required, be installed for individual applications on a single client (FIG. 3). Cryptographic and authentication methods are preferably used. Horizontally fragmented data storage and/or replication can additionally be used. Vertical fragmentation is already implicitly predefined by the modular, independent handling of the individual BOs. This procedure offers several advantages at the same time:

1. If unauthorized access is made to a server which has a cluster of BOs, no specific values such as the company name, for example, are available. In addition, possible inferences about substructures are also precluded if the BOs belonging to a structure are stored on different servers. Significantly improved data security is thus provided, which can be scaled as desired in that an enterprise can decide how many servers are equipped with how many clusters each. The flexibility is even so broad that a plurality of clusters or even merely a single cluster with all BOs can be stored on one client; a small association with a simple member database will obviously not supply its own server landscape.
2. Conventional databases store logically coherent data such as all types of data belonging to a product, for example, in a product data database, for example, and all types of data belonging to a customer in a customer database, for example. They are therefore organized in a subject-oriented manner and therefore make a holistic view of coherent data and processes impossible. Monolithic systems cover several subjects, but also only sub-areas of business modeling, and can be modified only with a lot of effort. In contrast, independent handling of BOs breaks up monolithic structures, and a holistic approach is enabled by the arbitrary structuring of the BOs.
3. The BO keys and 'clusters' assume parts of the database management system in their methods: It is decentralized. This has positive effects on data security and performance.

'Allocation' Business Object:

The allocation, i.e. the distribution of the BOs among different storage sites, can be stored in an 'allocation' BO. It does not contain any specific values, but instead also only keys. The access paths to the individual BOs are expediently divided into a plurality of structured BOs, such as domain name, server name, etc. If the 'allocation' BO is stored separately from other BOs, this further increases data security.

'Value' Business Objects (Value Objects):

While the key BOs only contain references, special BOs store the specific values such as the postal code ('postal code' BO) and the forename ('personal name' BO), for example, in FIG. 1. Each value BO (value object) is responsible for handling a data type, with any data types being definable, in contrast to the fixed data types in conventional databases, because the above-mentioned independence principle also applies to value BOs. Value BOs therefore include key value relations such as, for example, dates, telephone numbers, personal names, string-oriented data (words), etc. Only the key BOs in the lowest level in FIG. 1, such as forename and surname, contain a key, which can be found in the 'personal name' BO (the resolved key with grey background in FIG. 1).

Special value BOs can also contain formulas instead of specific values. The same methods as those described for the key BOs apply to the storage of the value BOs. The special value BOs are derived in the object-oriented sense from a base object, the 'base value' BO, which includes the attributes and methods that are valid for all special value BOs. In addition to the hardware distribution of the BOs, the content division into keys and specific data brings the further following advantages:

1. An additional, significant gain in data security. The specific values, for example personal data with name, address, date of birth, etc., are not stored in a database, but instead all the forenames and surnames, for example in a 'personal name' BO, and all postal codes, for example in a 'postal code' BO, can be stored separately from one another at various storage sites. Only the superordinate BOs contain valid combinations via the keys.
2. The strict division into keys and values enables the value BOs to be easily replaced in order, for example, to realize multilingual functionalities. If there is a value BO, the 'dictionary' BO, which contains all string-oriented data, i.e. words without proper nouns, in a language, multilingual functionality can be ensured by replacing this 'dictionary' BO with another dictionary, e.g. 'dictionary-ENG' BO, which contains words in the English language, without the functionality of the object database being adversely affected.

Figure 4:
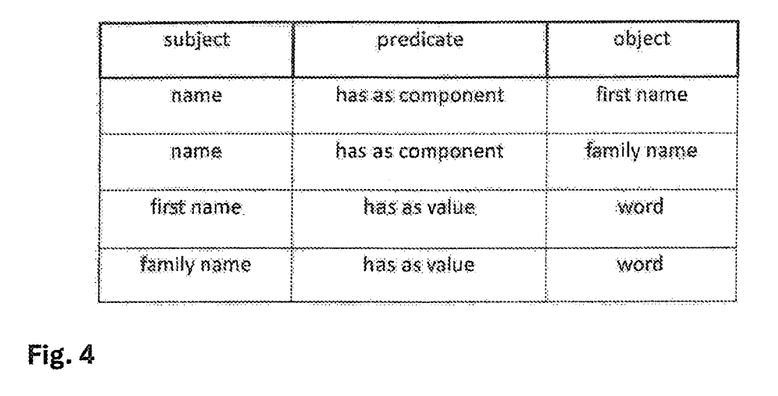
FIG. 4: An example of a possible schema of the 'structure semantics' business object.

'Structure Semantics' Business Object (Structure Semantics Object):

The generation of BOs including the definition of their structural relationships is possible with SBM using natural language sentences with a subject, predicate and sentence object. Sentence expansions with an adverb, adjectives and/or other grammar building blocks are possible. The 'structure semantics' BO (structure semantics object) is itself composed of the 'subject', 'predicate' and 'sentence object' BOs. Their specific values can be found in the 'dictionary' BO. Thus, the definition of the BO structures is itself treated as a BO, and so that stated above for BOs applies here also. FIG. 4 shows an example for the structure of the 'name' BO. If the user generates the instance 'name', 'has as component', 'forename' in the 'structure semantics' BO, the BOs 'name' and 'forename', if they do not yet exist, are created in the object database with the aid of corresponding methods of the 'structure semantics' BO and are generated or expanded with the corresponding structure.

Not only simple relationships such as 'has as component' are possible, but also other, more complex structures such as 'is special', for example, in order to enable inheritance between two BOs. The complete structure of a BO for resolving the keys into values such as 'customer', for example, in FIG. 1 can only be reconstructed with the aid of the structure semantics. Further advantages can be seen by the semantic definition and the separation of data and structure:

1. Further improved data security. If there is unauthorized access to BOs, access to the 'structure semantics' BO is also necessary for the complete resolution of the structures, said 'structure semantics' BO being advantageously stored at a separate storage site. And even if the structure of the BOs were to be known, access to the value BOs would still be required.
2. No programming knowledge is necessary for creating new BOs with their structures. Using natural language semantics, the relevant experts in an enterprise can define BOs in the SBM database without special database knowledge of BOs. The methods of the 'structure semantics' BO take on the creation in the object database.
3. Only the data objects are created which are actually required, whereas in the case of purchased databases such as a product data management system, for example, not all available data structures and functions can be used for every enterprise. Costs can thereby be saved. Users are provided with exactly what they require, and are thus spared the hassle of searching. Work is more efficient.

'Service Semantics' Business Object (Service Semantics Object):

Until now, the focus has been on the handling of attributes and not on that of methods in the object-oriented sense. In SBM methodology, attributes of BOs are in turn BOs which are created with the 'structure semantics' BO, and methods are services which are entered in the BO 'structure semantics' BO (service semantics object).

Figure 5:
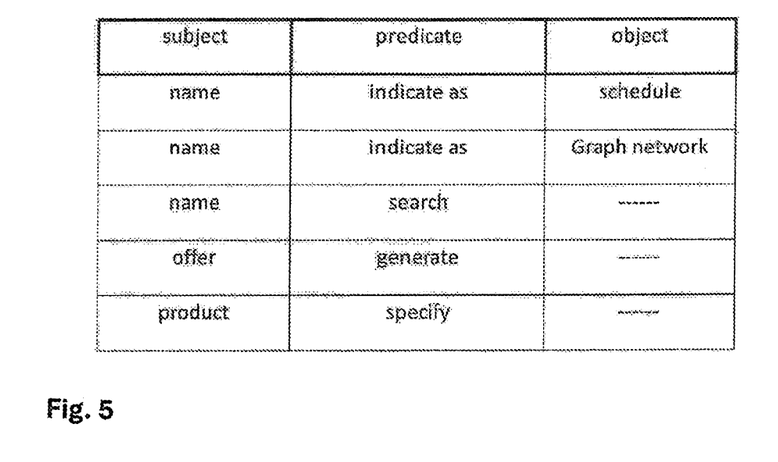
FIG. 5: An example of a possible schema of the 'service semantics' business object.

The services are also defined using natural language sentences, consisting of a subject, a predicate and a sentence object, with the latter being optional. Semantic expansions with other grammar objects are possible. A service (the predicate) is assigned to a BO (the subject in the sentence), for example 'create' 'offer' or 'specify' 'product' (FIG. 5). The examples are parts of a product formation process and make it clear that services can also represent processes in an enterprise. In this case, the process steps are no longer associated with certain roles (responsibilities) but rather with the BOs. This also applies to the decentralized database management system. The 'base' BO defines services such as search, change, display etc., for example, as a table for all derived BOs (FIG. 5). In the service semantics BO, only the service assignments are stored and no specific definitions for execution. A BO thus knows what services it can offer: object database functionality, process steps, actions, etc. The above-mentioned with respect to BOs applies for the 'service semantics' BO, including the subordinate BOs.

'Process' Business Object (Process Object):

The 'process' BO determines the specific process steps for the service assignments in the 'service semantics' BO. The structure of the 'process' BO consists of a 'service semantics' BO, which represents the calling service, and a 'process step' BO, which in turn includes a 'start state' BO, a further 'service semantics' BO, the service or delegate to be executed and an 'end state' BO. BOs can have any start and end states; they indicate which state a BO has, for example the 'development' state of a product which is currently being specified. If a service is requested and said service is to be found in the 'process' BO as a calling service, the associated process step is carried out by setting the associated start state of a BO and starting the associated delegate, which can also include creating a task for an employee. The delegate itself can also be a calling service in another process so that it is automatically started. If the service to be executed is completed, the end state is set. If the end state is simultaneously also a start state of another process, the new process is automatically started, as a result of which sequential processes are possible. The states do not need to be assigned to the same BO which is responsible for the calling service; this also applies to the service to be executed. Any process sequences can thus be established and completed. The 'process' BO can obtain further BOs as attributes, such as process managers, etc. with the aid of the 'structure semantics' BO. The above-mentioned with respect to BOs applies for the 'process' BO, including the subordinate BOs. This type of process definition, including the service definition, has the following advantages:

1. BOs know autonomously what has to be done. Whereas, in process-oriented business modeling, data are subordinate to the processes as parameters, the object-oriented SBM approach inverts this relationship: Data are first defined as BOs and processes are assigned to these objects as methods. Processes can therefore take place automatically in a controlled manner by the BOs, without additional expenditure for workflow programming, and BOs can display precisely only those processes to the user which it can also execute. Processes no longer lie dormant in a separate database as mere documents, and searching for them is no longer necessary because BOs themselves know what has to be done.
2. Simple delegation and propagation of tasks between the BOs can be freely defined because the services and states can be assigned to different BOs. As a result, there is no limitation to processes which can only be carried out by a BO.
3. If a process is to be added as a new method to a BO, the BO in the object database is not changed, but rather a new instance is simply added to the 'service semantics' and 'process' BOs.
4. Not only the separate storage of data (attributes) and processes (methods) brings about improved data security, but also the fact that the BOs (services, states) used in a process can be stored separately from one another at different storage sites. Processes include sensitive knowledge of an enterprise.

'Action' Business Object:

In principle, the 'action' BO is structured in the same way as the 'process' BO with the one difference that the delegate does not define a service but includes the name of an executable software module. The same principles apply to the procedure, except that, instead of a service, a software module is started via its name in order to carry out specific actions. The software modules are created as BOs in the object database and can be stored in a plurality of libraries distributed at a plurality of storage sites. The above-mentioned with respect to BOs applies for the 'action' BO, including the subordinate BOs. In addition to the already mentioned advantages for the 'process' BO, the actions offer further advantages:

1. BOs become intelligent because they can execute specific actions autonomously when a certain state is reached. If, for example, a factory standard specifies a 3D standard geometry which must always be used in the design of a particular component of a product, a corresponding action can automatically insert this geometry into the design.
2. Executable code in special BOs is separated from other BOs in a modularized manner, which supports the requirement for a non-monolithic system. Owing to modularization, the software is much easier to maintain. The described principles for processes and actions can be applied to the database functionalities themselves. If, for example, a user wants to search in data records (instances) of the 'customer' BO, the 'customer' BO autonomously offers services such as 'search', 'display as' 'table', 'enter' etc. If the user selects 'display as' 'table', the described procedure for processes and actions is carried out so that said user ultimately is given the desired selection screen for the customer data records. If the name 'search' of the module in the 'action' BO is replaced, for example, by the name 'find', another software module can be started with this simple replacement and another user interface can be displayed.
3. The separation of code BOs and other database BOs and the splitting of the code BOs themselves into different libraries at different storage sites provide an additional increase in data security.
4. Alongside the 'process' and 'action' BOs, the objects can autonomously and automatically execute processes, in particular not only for the purpose of control but also for the purpose of a holistic simulation.

'Permission' Business Object:

Generally, certain roles and thus responsibilities are assigned to employees of an enterprise. Different roles are generally also subject to different data protection provisions. Therefore, permission concepts control specifically what and what not an employee with a particular role is allowed to see in terms of data. The permissions of individual roles are defined in the 'permission' BO, wherein one or more other BOs including the permission, such as read, change, etc., is/are assigned to a 'role' BO. Access to individual BOs or to whole BO hierarchies can thus be permitted. If necessary, access to individual instances of a BO can also be restricted. BOs can be assigned to specific contexts via a 'context' BO, such as shopping, personnel, development, etc., for example. In this way, permissions can also be defined for whole contexts without assigning individual BOs. By changing the context, the above-mentioned multilingual functionality can also be easily implemented. The above-mentioned with respect to BOs applies for the 'permission' BO, including the subordinate BOs. This type of permission concept has the following advantages:

1. Purchased databases such as for product life cycle management, for example, often contain very complex permission management which is difficult to maintain. The SBM methodology with the 'permission' BO allows enterprises to adapt the complexity of a permission concept to its own requirements and to assign permissions in a simple manner. The multilevel system of permissions options for contexts, BO structures, individual BOs right down to instances of BOs improves overview and saves time spent on the defining aspect. If an employee receives a read permission for the 'customer' BO (FIG. 1), for example, the entire substructure can also be enabled for said employee if desired.
2. The 'permission' BO can also comprise processes and methods which support the assignment of rights, such as an approval workflow, for example.
3. As already mentioned in the case of the other BOs, there is also the possibility here of separate, specially secured storage.

'Rule' Business Object:

Knowledge management is more efficient and more effective when not only information is provided, but when the knowledge itself assumes an active role and itself knows where it needs to be applied. Since process management is always part of knowledge management, the 'service', 'process' and 'action' BOs are already part of the active knowledge. The 'rule' BO supports decisions and services by storing rules which are semantically defined with natural language sentences as in the case of the 'structure semantics' BO. In the condition part, reference is made to the attributes of BOs or to their states, with it being possible to logically link several conditions to one another. The consequence part contains services or describes new relationships which do not necessarily have to reference BOs. In addition to the possibility of representing knowledge in rules, other BOs are conceivable which can store and allow knowledge to be handled in other representations. The above-mentioned with respect to BOs applies for the 'rule' BO, including the subordinate BOs. This manner of managing knowledge has the following advantages:

1. As required in the BRM, rules and processes are defined separately from one another, but can nevertheless be easily linked to one another by the SBM methodology.
2. As already mentioned in the case of the other BOs, there is also the possibility here of separate, specially secured storage.
3. While knowledge is usually stored in separate knowledge databases, the holistic approach of SBM is also shown here in the storage and utilization of knowledge. The 'rule' BO, like all other BOs, can also be linked to other BOs as required so that the BOs themselves can provide knowledge in the form of rules and can also act autonomously accordingly. The knowledge-based, autonomous acting of the BOs goes far beyond the approach "the correct information at the correct time at the correct location".

'Dispatcher' Business Object:

Clients communicate with the database via instances of the BO 'dispatcher'. The dispatcher knows which other BOs provide it with services, processes and actions in order to provide the requested information. It asks, for example, the 'allocation' BO where the data are to be found, the 'permission' BO whether access is permitted and corresponding 'cluster' BOs which are to provide it with values. Its own methods are also defined and controlled via the 'service', 'process' and 'action' BOs. The above-mentioned with respect to BOs applies for the dispatcher BO, including the subordinate BOs. This type of data access has the following advantages:
1. Database access can be controlled by a plurality of instances of the dispatcher so that the computing load is distributed among different servers.
2. As already mentioned in the case of the other BOs, there is also the possibility here of separate, specially secured storage.

'Base Graph' Business Object:

While the key BOs are table-oriented and thus are rather less suitable for networked data, the 'base graph' BO provides attributes and methods which are necessary for BOs operating according to the graph principle and can be inherited by this BO. To give just one example, a 'contacts' BO can be created. This includes the above-mentioned example as 3 instances: 'Man1' 'knows' 'Woman1'; Man1 'knows' Woman2; 'Woman1' 'knows' 'Woman3'. Further instances can be: 'Woman1' 'is married to' 'Man3'; 'Man3' 'is the father of' 'Woman2'. The methods provide, for example, traversal algorithms via the 'action' BO. Any other BOs can be defined which operate according to the graph principle. The above-mentioned with respect to BOs applies for the 'base graph' BO and BOs derived therefrom, including the subordinate BOs. The possibility of using graph principles has the following advantages:
1. Various principles for data handling (table-, object- and graph-oriented) are available in a database. The best methodology can thus be selected in each case for a specific application. In addition to the graph principle, other methodologies such as those of document-based databases, blockchain and neural networks, for example, can also be used in the same way.
2. Graph BOs do not stand alone, but can instead have links to any other BOs. The nodes in a graph can be, for example, the keys of the instances in a people database so that names, addresses, dates of birth, etc. can be deduced in the node. The contents of other BOs can thus be considered as properties of the nodes. The use of different principles with the simultaneous linking of their data supports, in particular, the requirement for holistic business modeling.

LIST OF REFERENCE SIGNS

BO-Ki-j Business object keys numbers i to j
BO-W Value business object
BO-StS 'Structure semantics' business object
BO-SeS 'Service semantics' business object
BO-P 'Process' business object
BO-A 'Action' business object
BO-B 'Permission' business object
BO-Wi 'Knowledge' business object
BO-D 'Dispatcher' business object
BO-Ck 'Cluster' number k business object
Cl-p Client number p
CL-A Client application number o
CL-Ps Client process number s
Mod Software modules as business object
DBS-m Database server number m
DBS-Sn Database server with increased security number n
PS-q Permanent memory number q
PS-Sr Permanent memory with increased security number r
RSM Computer with increased security for Mod
KN Communication network
KP Communication between processes

The invention claimed is:

1. A computer-implemented method for business modeling in an enterprise environment,
wherein enterprise data and processes are represented as business objects with corresponding instances, each business object representing a decentralized object database system with its own object database management system distributed across a plurality of servers at different locations for data security and scalability and in order to handle large amounts of data, the method comprising:
i) setting up the structure of the decentralized object database systems, comprising:
fragmenting each business object into attributes and methods, each fragmented attribute and method being processed as a business object,
defining relationships between business objects according to a definable sentence structure model, the relationships being stored and processed as business objects,
defining the fragmented methods as service, action, and process business objects assigned to other business objects via said relationships to enable automatic execution, and
modeling the structure of the object database management system as the fragmented business objects,
ii) generating, by processors in communication with data memories and with other processors via a computer network, from said relationships each fragmented business object as either a key business object or a value business object for reasons of data security, thereby forming business objects as decentralized object database systems with their own object database management systems in order to handle large amounts of data as instances of business objects, and
iii) using the fragmented business objects as a database, wherein a client processor configured to communicate with the fragmented business objects via said computer network processes requests to the decentralized object database systems.

2. The method of claim 1,
wherein the fragmented business objects are stored in a cluster, and
wherein each cluster is stored modularly in a fragmented fashion.

3. The method of claim 1,
wherein the fragmented business objects are formed either exclusively by key business objects or by value business objects,
wherein the key business objects contain, in their stored instances, only a plurality of references to instances of subordinate fragmented business objects, the subordinate fragmented business objects being either another key business object or a value business object, and the key business objects do not contain any specific values in their stored instances in order to hide specific values for reasons of data security,
wherein the value business objects contain a plurality of specific values and a reference to each value in their stored instances, the references being usable by key business objects, and
wherein, in response to a request, said processors cause the database management system of the key business objects to create or resolve references in the key business objects to specific values.

4. The method of claim 1, wherein a process is defined as a process business object with the structure of its attributes and methods as fragmented business objects specified by said relationships and is generated as an object database system by said processors to handle the instances of processes, the method comprising the steps of assigning:
- an instance of a service business object to the process business object,
- one or more instances of a start state business object to the process business object,
- one or more instances of a service business object, of an action business object or of a process business object to a start state, and
- one or more instances of an end state business object to the start state,
- wherein said assigned business objects are stored, for reasons of data security, as fragmented business objects on distributed servers connected by said network, and
- wherein the method further comprises, under control of said processors, automatically executing processes as part of the database management system by:
- finding the instance of the process business object,
- setting a first start state assigned to the process business object or a fragmented process business object,
- executing one or more of the assigned services, actions and processes linked to the first start state,
- setting one or more end states assigned to the first start state, and
- setting a subsequent start state in the process business object or fragmented process business object that matches the set one or more end states, thereby initiating the next process step.

5. The method of claim 1,
- wherein the relationships and the methods are defined, in one embodiment, by a sentence structure model based on natural language sentences, or
- wherein the relationships and the methods are defined by a model other than a natural language sentence structure model, including but not limited to a formal grammar model, a symbolic representation model, or another definable model.

6. The method of claim 1,
- wherein the database management system of a business object as a decentralized database is itself realized by business objects, and
- wherein the functionality of the database management system is realized via the methods thereof.

* * * * *